April 23, 1963 J. BAUDE ET AL 3,087,106
SURGE CONTROLLER FOR PROTECTING A SOURCE OF ELECTRICAL ENERGY
Filed July 18, 1960
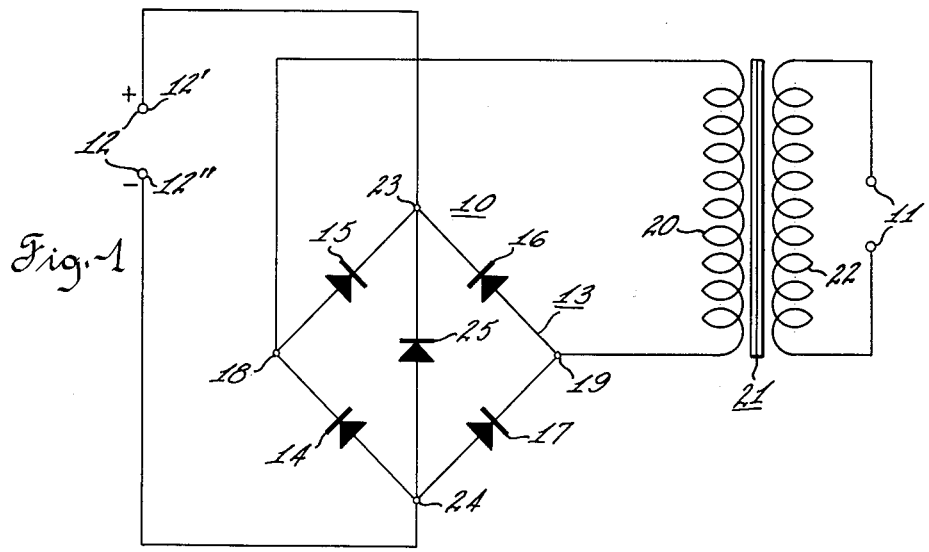
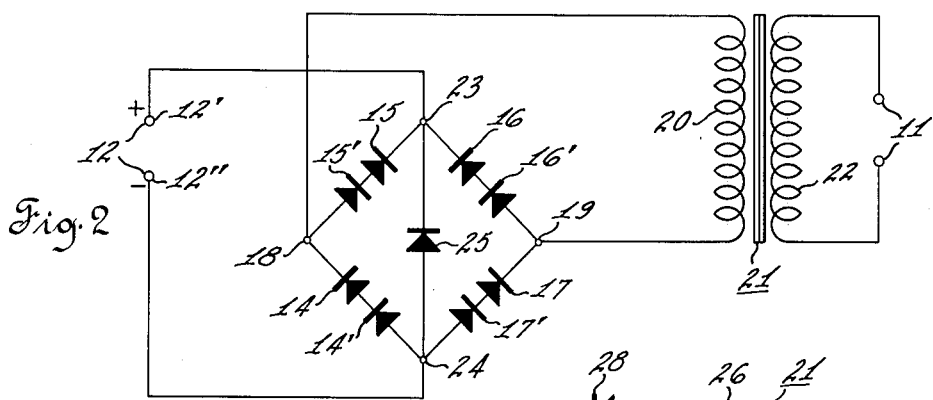
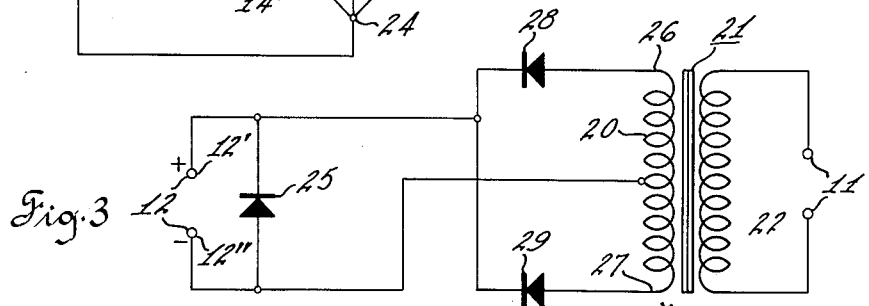
Inventors
John Baude
Willard S. Lorenz
By Warren F. B. Lindley
Attorney

United States Patent Office 3,087,106
Patented Apr. 23, 1963

3,087,106
SURGE CONTROLLER FOR PROTECTING A
SOURCE OF ELECTRICAL ENERGY
John Baude, Milwaukee, and Willard S. Lorenz, Waukesha, Wis., assignors to Allis-Chalmers Manufacturing Company, Milwaukee, Wis.
Filed July 18, 1960, Ser. No. 43,595
6 Claims. (Cl. 321—11)

This invention relates to a dual polarity signal valve and more particularly to a surge controller for protecting a source of electrical energy from surge currents occurring in a load circuit.

In the present day electronic circuits utilized for controlling the operation of expensive and delicate electrical equipment it is necessary to control or suppress unwanted random current surges which if not controlled may untimely influence certain electrical components. This control is particularly necessary when the equipment is inactive but balanced for fast control action upon the sensing of a predetermined electrical system change.

In accordance with the invention claimed a new and improved dual polarity signal valve is provided for connecting a source of current to a load. The valve comprises a full wave rectifier employing diodes having a relatively high forward resistance. A diode having a relatively low forward resistance is connected in shunting arrangement with the rectifier. The low resistance diode alternately blocks and bypasses surge currents from the load circuit past the rectifier.

It is, therefore, one object of this invention to provide a new and improved dual polarity signal valve for connecting a source of electrical energy to a load circuit.

Another object of this invention is to provide a new and improved surge controller which bars any current surge from passing from a load circuit back to a supply circuit.

A further object of this invention is to provide a new and improved surge controller in which a full wave rectifier is short circuited in one direction so that current surges cannot be passed through it to its alternating current supply.

A still further object of this invention is to provide a new and improved surge controller employing a full wave rectifier using diodes having a relatively high forward resistance shunted by a diode having a relatively low forward resistance.

Objects and advantages other than those set forth will be apparent from the following description when read in connection with the accompanying drawing, in which:

FIG. 1 is a diagrammatical illustration of the dual polarity signal valve connecting an alternating current source to a load and embodying the invention; and FIGS. 2 and 3 are modifications of the circuit structure illustrated in FIG. 1.

Referring more particularly to the drawing by characters of reference FIG. 1 illustrates a dual polarity signal valve or surge suppressor 10 connecting an electrical source which may be, for example, an alternating current source 11 to a load circuit 12. The surge suppressor 10 comprises a full wave rectifier 13 having four diodes 14, 15, 16 and 17 connected in a bridge arrangement. Each of these diodes may be silicon diodes which have relatively high forward resistance. Terminals 18 and 19 of the bridge arrangement are connected across the secondary winding 20 of a transformer 21. A primary winding 22 of transformer 21 is connected across the source of the alternating current supply 11. Terminals 23 and 24 of the silicon diode bridge are connected across the load circuit 12. Any current applied to the rectifier by the secondary winding of transformer 21 is rectified by the diodes 14, 15, 16 and 17 and appears across the terminals 12', 12" as full wave rectified unidirectional direct current.

In order to block any current surge occurring in the load circuit during the time the bridge rectifier is passing surge current from being fed back through transformer 21 to the alternating current source 11 and the control equipment associated therewith, rectifiers 14, 15, 16 and 17 would have to be perfectly matched to keep the potential difference between points 18 and 19 zero. By connecting a diode 25 having a relatively low forward resistance across terminals 23 and 24 of the full wave bridge rectifier 13, perfect matching of diodes 14, 15, 16 and 17 becomes unnecessary. Diode 25 which may be a germanium diode alternately blocks and bypasses surge currents from the load circuit past the rectifier 13 thereby bypassing the secondary terminals of the secondary winding 20 of transformer 21. Positive polarity surge currents occurring at terminal 12' of source 12 are blocked at terminal 23 of rectifier 13 by diodes 15, 16 and 25 from entering the secondary winding 20 of transformer 21. Positive polarity surge currents occurring at terminal 12" of source 12 and at terminal 24 of the rectifier 13 are passed by the relatively low resistance germanium diode 25 through terminal 23 of rectifier 13 to the terminal 12' of source 12 thereby bypassing the terminal of the secondary winding 20 of transformer 21. Thus, the surge controller 13 suppresses or short circuits all surge pulses occurring in the load circuit past the secondary winding of transformer 21. These surge pulses may be of a constant nature or of a random type and may be of any kind such as alternating current and unidirectional direct current or voltage pulses. The surge controller 13, thus, is effective regardless of the potential at terminals 12' and 12".

In order to increase the relative resistance between the diodes 14, 15, 16 and 17 of the bridge rectifier 13 and the short circuiting diode 25, an additional diode may be added in each arm of the bridge circuit. FIG. 12 illustrates this modification wherein diodes 14', 15', 16' and 17' are added, respectively, in the branches of the bridge circuit containing diodes 14, 15, 16 and 17. This arrangement further increases the voltage drop in each branch circuit relative to the germanium diode 25.

FIG. 3 illustrates a further modification of the invention illustrated in FIGS. 1 and 2 wherein transformer 21 is provided with a center tap on the secondary winding 20. Terminal ends 26 and 27 of winding 20 are connected in a parallel arrangement through silicon diodes 28 and 29 to terminal 12' of the load circuit 12. The center tap 30 of winding 20 is connected to terminal 12" of the load circuit 12. Germanium diode 25 is connected in shunting arrangement across terminals 12', 12", as shown. When transformer 21 is energized alternating current impressed on the secondary winding 20 from the primary winding 22 is rectified. When a positive polarity surge pulse is impressed on the positive terminal of the load circuit 12, for example terminal 12', it is blocked from flowing through the secondary winding 20 of transformer 21 by diodes 25, 28 and 29. If a positive polarity surge is impressed on terminal 12" it could enter the center tap of transformer 21 and flow through diodes 28 and 29 to terminal 12' of load circuit 12. The electromagnetic effect of this current flow through each half of winding 20 is opposite to each other and would not induce voltage in primary winding 22 of transformer 21 providing each half of the secondary winding has an equal number of turns. In view of the fact that it is difficult to obtain production wound center tap windings with exactly the same number of winding turnings in each half section germanium diode 25 is provided for bypassing the surge pulse past winding 20. Thus, dual protection is provided for surge protection of electrical systems controlled by the alternating current supply 11.

Although but a few embodiments of the present invention have been illustrated and described, it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. A dual polarity signal valve connecting a source of current to a load, said valve comprising a full wave rectifier, said rectifier comprising diodes having a relatively high forward resistance, and a diode having a relatively low forward resistance directly connected in shunting arrangement with said rectifier, said low resistance diode blocking and bypassing surge pulses from said load past said rectifier.

2. A dual polarity signal valve connecting a source of alternating current to a load, said valve comprising a full wave rectifier, said rectifier comprising diodes having relatively high forward resistance, and a diode having a relatively low forward resistance directly connected in shunting arrangement with said rectifier, said low resistance diode alternately blocking and bypassing surge pulses from said load past said rectifier.

3. A surge controller connecting a source of alternating current to a load, said controller comprising a full wave rectifier, said rectifier comprising silicon diodes having relatively high forward resistance, and germanium diode having a relatively low forward resistance directly connected in shunting arrangement with said rectifier, said low resistance diode alternately blocking and bypassing surge currents from said load past said rectifier.

4. A surge controller connecting a source of current to a load, said controller comprising a rectifier, said rectifier comprising silicon diodes having relatively high forward resistance for passing current in one direction to said load, and a germanium diode having a relatively low forward resistance directly connected in shunting arrangement with said rectifier, said low resistance diode cooperating with said rectifier for blocking current flow from said load to said source in one direction and bypassing current flow from said load past said rectifier in a second direction.

5. A surge controller connecting a source of alternating current to a load, said controller comprising a full wave bridge rectifier, said rectifier comprising at least four silicon diodes having relatively high forward resistance, and a germanium diode having a relatively low forward resistance directly connected in shunting arrangement with said rectifier, said low resistance diode cooperating with said rectifier for blocking current flow from said load to said source in one direction and bypassing current flow from said load past said rectifier in a second direction.

6. A surge controller connecting a source of alternating current to a load, said controller comprising a full wave rectifier, said rectifier comprising four pairs of diodes each diode having a relatively high forward resistance, and a germanium diode having a relatively low forward resistance directly connected in shunting arrangement with said rectifier, said low resistance diode cooperating with said rectifier for blocking current flow from said load to said source in one direction and bypassing current flow from said load past said rectifier in a second direction.

References Cited in the file of this patent

UNITED STATES PATENTS

| 1,784,004 | Geiger et al. | Dec. 9, 1930 |
| 2,316,331 | Hedding | Apr. 13, 1943 |
| 2,357,418 | Mattheyses | Sept. 5, 1944 |
| 2,969,494 | Davis | Jan. 24, 1961 |

FOREIGN PATENTS

| 965,914 | Germany | June 27, 1957 |